(12) United States Patent
Gorintin et al.

(10) Patent No.: US 10,563,803 B2
(45) Date of Patent: Feb. 18, 2020

(54) ELECTRONIC DEVICE INTENDED FOR BEING INSERTING INTO A PIPE, AND METHOD FOR INSTALLING THE DEVICE

(71) Applicant: Engie, Courbevoie (FR)

(72) Inventors: Louis Gorintin, Montrouge (FR); Maher Oudwan, Paris (FR); Jean-Michel Bideault, Guipry (FR)

(73) Assignee: Engie, Courbevoie (FR)

( * ) Notice: Subject to any disclaimer, the term of this patent is extended or adjusted under 35 U.S.C. 154(b) by 44 days.

(21) Appl. No.: 16/067,092

(22) PCT Filed: Dec. 29, 2016

(86) PCT No.: PCT/FR2016/053681
§ 371 (c)(1),
(2) Date: Jun. 28, 2018

(87) PCT Pub. No.: WO2017/115054
PCT Pub. Date: Jul. 6, 2017

(65) Prior Publication Data
US 2019/0011071 A1    Jan. 10, 2019

(30) Foreign Application Priority Data

Dec. 31, 2015 (FR) ...................................... 15 63505

(51) Int. Cl.
*F16L 41/00* (2006.01)
*F17D 3/18* (2006.01)
(Continued)

(52) U.S. Cl.
CPC ............. *F16L 41/008* (2013.01); *F16L 41/04* (2013.01); *F17D 3/18* (2013.01); *G01F 1/00* (2013.01); *G01L 19/0007* (2013.01)

(58) Field of Classification Search
CPC ........... F16L 14/008; F16L 14/41; F17D 3/18; G01F 1/00; G01F 19/0007
(Continued)

(56) References Cited

U.S. PATENT DOCUMENTS 3,804,545 A * 4/1974 Chistov ................. B23B 51/044
                                                        408/101
3,976,091 A * 8/1976 Hutton .................. B23B 51/044
                                                        137/318
(Continued)

FOREIGN PATENT DOCUMENTS

DE        3524219 A1    1/1987
DE      10114648 A1   10/2002
(Continued)

OTHER PUBLICATIONS

International Search Report dated Mar. 28, 2017 in connection with International Patent Application No. PCT/FR2016/053681.
(Continued)

*Primary Examiner* — Nimeshkumar D Patel
*Assistant Examiner* — Jean F Morello (57) ABSTRACT

An electronic device includes a body having a threaded portion configured to co-operate with a threaded portion of a duct in a sleeve in order to move the device into a final position when the device is turned. The electronic device also includes a hole punch configured to form a through orifice in a pipe while the device is being turned and to enable the device to be inserted into the final position. The electronic device further includes an electronic module configured to be in contact with a fluid passing through the pipe when the device is in the final position. In addition, the electronic device includes at least one electrical connection connected to the electronic module and passing through the body leading to a top face of the body. The body and the at
(Continued)

least one electrical connection form a plug of the duct in the sleeve.

20 Claims, 10 Drawing Sheets

(51) Int. Cl.
*F16L 41/04* (2006.01)
*G01F 1/00* (2006.01)
*G01L 19/00* (2006.01)

(58) Field of Classification Search
USPC ........................................................ 73/866.5
See application file for complete search history.

(56) References Cited

U.S. PATENT DOCUMENTS

| | | | | |
|---|---|---|---|---|
| 4,370,893 | A * | 2/1983 | Combes | G01F 1/42 73/432.1 |
| 6,126,369 | A * | 10/2000 | Jiles | F16L 41/04 137/318 |
| 6,142,166 | A * | 11/2000 | Kuzan | F16L 41/04 137/15.14 |
| 6,446,662 | B1 * | 9/2002 | Wagner | F16L 41/04 137/15.14 |
| 2006/0175827 | A1 * | 8/2006 | Hutton | F16L 41/008 285/125.1 |
| 2011/0187096 | A1 * | 8/2011 | Lillejordet | E21B 43/013 285/39 |
| 2013/0098473 | A1 * | 4/2013 | Wassil, Jr. | F16L 41/04 137/15.12 |

FOREIGN PATENT DOCUMENTS

| | | |
|---|---|---|
| FR | 1591769 A | 5/1970 |
| FR | 2417052 A1 | 9/1979 |
| FR | 2692334 A1 | 12/1993 |

OTHER PUBLICATIONS

Written Opinion of the International Searching Authority dated Mar. 28, 2017 in connection with International Patent Application No. PCT/FR2016/053681.

* cited by examiner

ELECTRONIC DEVICE INTENDED FOR BEING INSERTING INTO A PIPE, AND METHOD FOR INSTALLING THE DEVICE

CROSS-REFERENCE TO RELATED APPLICATIONS AND PRIORITY CLAIM

This application claims priority under 35 U.S.C. § 365 to International Patent Application No. PCT/FR2016/053681 filed on Dec. 29, 2016, which claims priority to French Patent Application No. 1563505 filed on Dec. 31, 2015. Both of these applications are hereby incorporated by reference in their entirety.

BACKGROUND

The invention relates to the general field of distributing fluids, and it relates most particularly to installing electronic devices in pipes that convey a flow of natural gas.

A particular application of the invention lies in installing electronic devices in pipes made of polyethylene or of polyvinyl chloride (PVC), or of any other plastics material adapted to conveying fluids.

New energy sources are now available that are cleaner and renewable. Biomethane is one of these energy sources. Biomethane is obtained by fermenting agricultural, household, or industrial waste, or indeed fermenting sludge from sewage plants. Biomethane can be purified specifically to obtain quality that matches the properties required for being injected into a natural gas network. More precisely, the gas is odorized, monitored, and its pressure is regulated so that it can then be injected into a natural gas distribution network in order to be taken to consumers. Whereas natural gas has traditionally been distributed via a descending tree structure, natural gas must nowadays be distributed using a mesh structure as a result of the increasing number of biomethane distribution points.

In such a mesh structure, it is particularly important to know how gas is flowing, in particular in order to adapt production needs as a function of consumption. This knowledge about flows can be obtained by measuring the pressure, the flow rate, and physico-chemical parameters of the natural gas at numerous measurement points. In order to obtain accurate knowledge about flows, it is necessary to use a large number of measurement points. That leads to good knowledge about the quality of the gas, about its pressure, and about the integrity of the structure. That also makes it possible to control members of the structure well and thereby optimize billing of clients who receive the gas.

Sensors (e.g. pressure or flow rate sensors) are traditionally installed in pipes or in stations known as "pressure regulator stations". That said, the locations where it is desired to take measurements are not always accessible for undertaking work in order to install sensors.

Those technical drawbacks have an impact on the cost and on the duration of work when installing sensors.

Another drawback of known techniques lies in the need to interrupt the flow of gas in the pipes while working on them.

In a first known technique, a pipe having gas flowing therein is pierced while using an isolation airlock or an apparatus for piercing a pipe conveying a flow of gas, and then an electronic system such as a sensor is inserted into the pipe.

In a second known technique, the electronic system is inserted by means of a probe.

Those known techniques present the following drawbacks:

installation work may require the flow of gas to be interrupted or at least the pressure of gas in the pipe to be reduced;

traditional electronic systems are very bulky (e.g. having a height of 1 meter (m) to 1.5 m), thereby making them installable only in locations that are sufficiently accessible;

traditional electronic systems require an external electrical power supply: that means that measurements can be taken only in the proximity of a power supply that is compatible with the European "ATEX" directive, well known to the person skilled in the art;

traditional electronic systems communicate the information they have recovered (if they are sensors) by means of wired networks; and the cost of traditional electronic systems is too high, as indeed are the costs associated with installing such systems: that prevents a large number of sensors being installed.

It may be observed that in order to enable an electronic system to be installed in a pipe without disturbing the flow of the fluid, installation work needs to take place in a pipe that, at some specific point, is straight between two ends. The point is selected so that the ratio of the distances between the two ends and that point is controlled (this ratio depends on the diameter of the pipe). This constraint further limits possibilities for installing a system using the prior technique.

The invention seeks specifically to mitigate some of those drawbacks, and it seeks in particular to obtain a device that is compact, easy to install, and capable of being inserted in a pipe while the pipe is conveying a flow of fluid.

SUMMARY

The present invention satisfies this need by proposing an electronic device for inserting in a pipe to a final position, the device also being configured to be arranged, prior to being inserted in said final position, in a sleeve that is assembled to a pipe and through which there passes a duct opening out onto a wall of the pipe, the device comprising:

a body having a threaded portion for co-operating with a threaded portion of the duct in the sleeve in order to move the electronic device into its final position by turning it;

a hole punch configured to form a through orifice in the pipe while said device is being turned and to enable the electronic device to be inserted into its final position inside the pipe;

an electronic module arranged between the hole punch and said body and designed to be in contact with a fluid passing through the pipe when the device is in said final position; and at least one electrical connection connected to the electronic module and passing through said body leading to a top face of the body situated at the end of said body opposite from the end where the electronic module and said hole punch are situated;

the body and said at least one electrical connection forming a plug of the duct in the sleeve.

Thus, the invention proposes a device enabling insertion and piercing of the pipe to take place simultaneously and to be performed while maintaining good leaktightness. There is thus no need to use an airlock in order to maintain leaktightness, nor are piercing and insertion performed in two distinct steps.

This results from the structure of the device, which includes both a hole punch and a threaded portion for co-operating with the threaded portion of the duct in the sleeve in order to maintain leaktightness. The use of the threaded portion and of a body that is solid makes it possible to obtain good leaktightness over pressure ranges that can be determined by the person skilled in the art. In certain applications, leaktightness may be obtained not only by co-operation between the threaded portions, but also by using an airlock, as described below.

The above-described device is thus particularly easy to install, since installation can be performed so long as the pipe is accessible and a sleeve can be assembled on a pipe, the sleeve having a duct with an opening that opens out onto a wall (the periphery of the opening being assembled to the wall in leaktight manner).

It may be observed that the term "forming a plug" should be understood as meaning that the body in which the electrical connections are embedded does not allow gas to pass into the duct of the sleeve, and together they form an assembly that is made leaktight by the co-operating threaded portions.

The hole punch serves to pierce an orifice when the device moves towards the pipe. It thus follows that the invention is applicable to pipes that are made of materials suitable for being pierced in this way. This applies to pipes made of polyethylene, which are well adapted to performing the invention.

It may also be observed that the device can be inserted into an already-existing sleeve as used for making branch connections. Such sleeves include a duct with a thread and they are welded onto the pipes.

In a particular embodiment, said top face includes a socket adapted to receive a screwdriver tool for turning said device.

In a particular embodiment, said top face includes at least one female electrical connector that is electrically connected to said at least one electrical connection.

Thus, the electrical module present in the pipe need include only a fraction of the electronic elements of a device that is more complete, e.g. a sensor as an electronic module.

In a particular embodiment, device includes a spacer for spacing the electronic module from said body.

The length of the spacer should be selected to place the electronic module at a point inside the pipe that is appropriate, depending on the selected application.

In a particular embodiment, said electrical connections extend at least along and over said spacer.

This makes it possible to cause the electrical connection to be more robust.

In a particular embodiment, the device includes walls holding said hole punch spaced apart from said body, said walls being provided with windows to allow the fluid in said pipe to pass to said electronic module when the device is in its final position.

In a particular embodiment, wherein the electronic module is a sensor.

By way of indication, the sensor may be a sensor measuring a flow rate, a methane index, a pressure, a temperature, an energy, or indeed a gross or net calorific value.

In a particular embodiment, said sensor is a flow meter and said device includes an indicator that is visible while it the device is being turned so as to place the device in a defined direction relative to the pipe (e.g. in the axial direction of the pipe).

In a particular embodiment, the electronic module is a module for modifying the flow or for treating the fluid.

The invention thus makes it simple to place section-modifying elements that act on the fluid, such as inflatable balloons or diaphragms. Alternatively, treatment modules such as filters can be actuated.

It is thus possible to regulate or interrupt a stream remotely if the electronic device is fitted with wireless communications means.

In a particular embodiment, the device further includes a connectable element that is connectable to the top face of said body and that is configured to be electrically connected to said at least one electrical connection when the connectable element is connected to the top face of said body, the connectable element including at least one additional electronic module selected from the group comprising: an embedded electrical power supply, a wireless communications module, a microcontroller, and a switch.

The term "connectable" is used to mean that the connectable element can be connected and disconnected.

It may be observed that under such circumstances the connectable element includes an embedded power supply and a wireless communications module, so the device can operate independently without any wired connection to some other device.

The embedded power supply may be a battery or a fuel cell.

The use of a connectable element including the embedded power supply thus makes it possible to power the electronic module only once the electronic module has been put into place in its final position: this reduces the risk associated with inserting an electronic appliance into a pipe containing gas. The use of an embedded power supply also makes it possible to avoid any need for a wired electrical power supply.

Furthermore, the use of an embedded power supply in the connectable element facilitates replacing the embedded electrical power supply without needing to move the remainder of the device, which is positioned in its final position.

The use of a switch serves to provide additional security while installing the device.

In a particular embodiment, said top face includes at least one female electrical connector that is electrically connected to said at least one electrical connection, and the connectable element is pluggable into said at least one female electrical connector.

The invention also provides a system including an electronic device as defined above, and at least one sleeve having a duct in which the device is arranged, the duct having a threaded portion co-operating with the threaded portion of the body of the device.

In a particular embodiment, the sleeve includes a connection portion arranged around the opening of the duct in the sleeve that opens out to the pipe, the connection portion being configured to be assembled to the pipe by welding so as to form a leaktight connection around said opening.

The welding may be electric welding, such as electric welding of the kind used by the person skilled in the art for assembling the sleeves of branch connections. This implies that the connection portion includes a heater resistance through which electricity is caused to flow in order to melt the material of the connection portion together with the material of the pipe (the connection portion and the pipe preferably being made of the same material).

In a particular embodiment, the system further includes a leaktight airlock suitable for assembling on said sleeve by screw-fastening, the leaktight airlock including a full-bore valve, an opening for passing a tool in leaktight manner into the airlock in order to reach said device in the sleeve and turn said device in one direction or the other in order to move it in the airlock (which opening may be formed in an airlock duct arranged in the airlock), the airlock being configured to allow said device to pass through the full-bore valve.

It is thus possible to use the airlock:
- to improve sealing while turning and piercing the pipe. Sealing is then obtained both by the electronic device screwed into the sleeve and also by the airtight airlock;
- to remove a device that is already in its final position; and/or
- to insert a device in a pipe that has already been pierced.

The full-bore valve should be opened to allow the tool and the device to pass through, and should be closed in order to provide leaktightness when the device is no longer present and the pipe has been pierced by the hole punch.

The invention also provides a method of installing an electronic device as defined above, wherein said electronic device is arranged in a sleeve that is assembled to a pipe and through which there passes a duct opening out at the pipe, the method comprising turning the device so as to move the device in the duct of the sleeve until it reaches said final position, said hole punch, while being turned, forming a through orifice in the pipe in order to enable the electronic device to be inserted in the pipe.

In a particular implementation, the device also includes a connectable element that can be connected to the top face of said body and that is configured to be electrically connected to said at least one electrical connection when the connectable element is connected to the top face of said body, the connectable element including at least one additional electronic module selected from the group comprising: an embedded electrical power supply, a wireless communications module, a microcontroller, and a switch, the method further including a step after said turning of the device, in which the connectable element is connected to the top face of the body.

In other words, the connectable element is not connected while the device is being turned.

In a particular implementation, the method further includes a subsequent step of fastening a plug on the opening of the duct remote from its opening out at the pipe.

The plug may form a portion of a system comprising both the device and the sleeve.

The plug may include a sealing gasket. The sealing gasket makes it possible to obtain a second leaktight barrier so as to avoid any gas being released to the outside. The gasket may be an O-ring.

In a particular implementation, the method comprises assembling a leaktight airlock on said sleeve by screw-fastening, the leaktight airlock including a full-bore valve, an opening for passing a tool in leaktight manner into the airlock in order to reach said device in the sleeve, the airlock being configured to enable said device to pass through the full-bore valve, said method further including a step of using said tool passing through the airlock to turn the device in the sleeve so as to drive it forwards, or using said tool passing through the airlock to turn the device so as to drive it backwards from the final position.

In a particular implementation, the method including said step of driving the device backwards, the method further includes a step in which said device is moved to the other side of the full-bore valve, and said valve is closed, or said method including said step of driving the device forwards, the method includes a prior step in which said valve is opened and the device is moved into the sleeve.

In a particular implementation, the method further includes, after said step of driving the device forwards, subsequently inserting a second electronic device as defined above, in which said second electronic device is placed in said leaktight airlock, the full-bore valve is opened, said second electronic device is moved into the sleeve, and said second device is driven forwards.

In other words, this implementation provides for replacing the device, e.g. if an embedded power supply of the device is exhausted, or if the device has failed.

It may be observed that the method may include a prior step of assembling said sleeve on a pipe.

BRIEF DESCRIPTION OF THE DRAWINGS

Other characteristics and advantages of the present invention appear from the following description made with reference to the accompanying drawings, which show an example having no limiting character.

In the figures.

DETAILED DESCRIPTION

There follows a description of an electronic device for installing in a pipe.

In the examples below, the target pipes are pipes made of polyethylene and conveying a flow of natural gas. Nevertheless, the invention is not limited to such pipes.

In the accompanying figures, the same references are used to designate the same elements.

Figure 1:
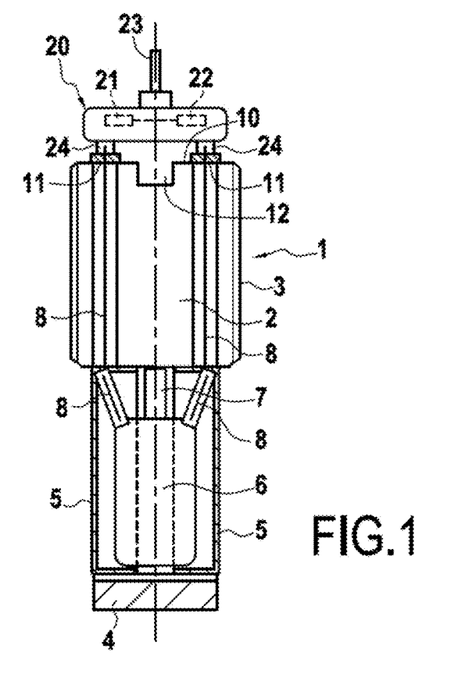
FIG. 1 is a diagrammatic view of a device in an embodiment of the invention.

In FIG. 1, there can be seen a section view of a device 1 that is to be inserted into a polyethylene pipe.

The device 1 comprises a metal body 2, e.g. made of brass (alternatively, ceramic materials may be used). The body is provided on its side walls with a threaded portion 3 that is designed to co-operate with a threaded portion of a duct in a sleeve for moving the device.

In order to penetrate into the inside of a pipe, the device comprises a hole punch 4 optionally made out of the same metal as the body 2, and the hole punch 4 is spaced apart from the body by walls 5. The hole punch has substantially the same dimensions as the remainder of the device so as to be capable of forming an orifice through which the device can pass.

The device includes an electronic module 6, in this example a flow meter, and the electronic module 6 is arranged between the hole punch 4 and the body 2. In order to place the electronic module 6 further inside the pipe, a spacer 7 is placed between the body 2 and the electronic module 6. The spacer 2 holds the electronic module.

Since the electronic module 6 is a sensor, other electronic elements are needed in order to make it operate. For this purpose, two electrical connections 8 are arranged to connect the electronic module 6 to other electronic elements. The electronic connections 8 extend from the electronic module to the body, and they are embedded in the body 2 so as to lead to the top face 10 of the body 2 (the top face being at the end of the body 2 that is opposite from the end where the electronic module 6 and the hole punch 4 are located).

Since the electrical connections 8 are embedded in the body 2, the body and the electrical connections form a solid element that can act as a plug for a duct having threads to co-operate with the threaded portions 3 of the device. More precisely, the electrical connections 8 lead to female electrical connections 11 at the top face 10 of the body 2.

In order to move the device 1 in a duct, a socket 12 is provided within the top face 10 of the body 2, the socket being adapted to receive a screwdriver tool for turning the device.

FIG. 1 shows the electronic device 1 with a connectable element 20. In this example, the connectable element 20 comprises a battery 21 and a wireless communications module 22. In order to cause the device 1 to start, a switch 23 is arranged on the connectable element 20. The connectable element 20 is connected to the top face of the body 2 by plugging electrical connections 24 of the connectable element into the electrical connections 11 open in the top face 10.

It may be observed that the wireless communications module 22 may use any known protocol for returning the information picked up by the electronic module 6. By way of indication, the wireless communications module may enable the device to be incorporated in a cellular communications network.

The various components of the connectable element 20 may be arranged within a single printed circuit card.

Resilient gaskets may be placed around the electrical connectors, as shown in the figure.

As can be understood from FIG. 1, while the device is being turned by the screwdriver, the socket 12 must be accessible. For this purpose, the connectable element 20 is not connected while the screwdriver is in use, but only after the remainder of the device has reached its final position.

Figure 2:
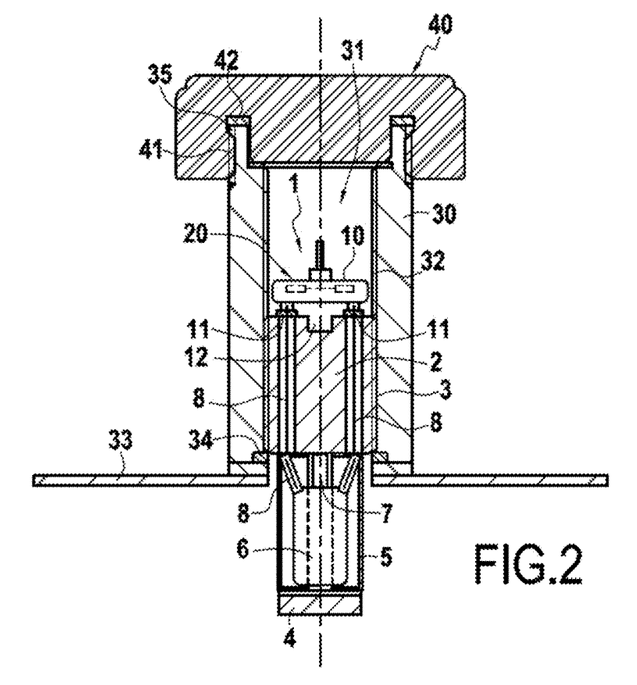
FIG. 2 shows a system comprising the FIG. 1 device and a sleeve.

FIG. 2 shows a system comprising a device 1 as described with reference to FIG. 1 together with a sleeve 30.

The sleeve 30 has a duct 31 in which the device 1 is arranged. FIG. 1 shows the device 1 with the connectable element 20 and it is also shown in a position corresponding to the position occupied by the device when inserted in a pipe. Specifically, the device 1 can move in translation in the duct 31. This movement is obtained by using the threaded portion 32 of the duct 31 while using a tool in the socket 12 to apply torque.

The sleeve 30 has a connection portion 33 that extends radially relative to the axis of the duct 31 (axis drawn as a chain-dotted line). The connection portion is for assembling to a pipe. Since pipes are generally cylindrical and of circular section, the connection portion 33 may also extend in the axial direction of the duct 31 so as to match the shape of the pipe.

In an alternative that is not shown herein, the sleeve 30 includes another part referred to as a "saddle" that is placed facing the connection portion 33 in order to surround the pipe in order to join the connection portion 33, as is conventional for branch connection sleeves known in the prior art. In addition, the connection part 33 may include a heater resistance that can be caused to pass electricity in order to melt the connection portion together with the pipe: this makes it possible to obtain an opening of the duct 31 that is closed in leaktight manner by the wall of the pipe where it terminates and by melting the connection portion 33 with the wall of the duct.

As mentioned above, in this example the device 1 is placed in its final position, with the body 2 and the connection 8 forming a plug in the duct 21, since the threaded portions 3 and 32 co-operate. In order to improve leaktightness, a gasket 34 is placed at the opening of the duct 31 so that the threaded portion 3 comes up against the gasket when the device is in its final position.

In order to further improve leaktightness, the system includes a plug 40 positioned so as to plug the opening of the duct that is opposite from its opening placed against the wall of the duct. The plug 40 has a threaded portion configured to co-operate with a threaded portion 35 located on the outside of the sleeve. The plug 40 also includes a gasket 42.

Figure 3A:
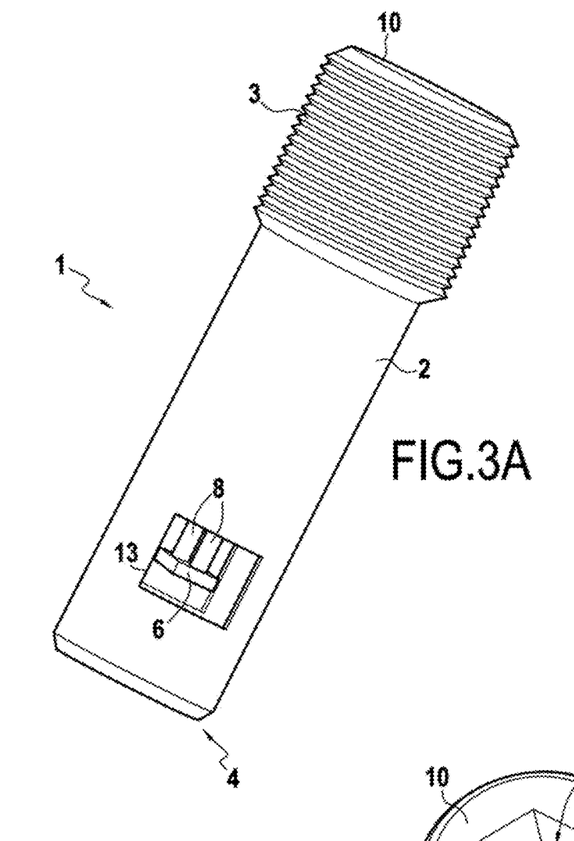
FIGS. 3A and 3B are perspective views of a device in an embodiment of the invention.

FIG. 3A is a perspective view of a device 1 without its connectable element. As can be seen in this figure, the device 1 is almost in the shape of a cylinder of circular section.

The device 1 includes windows 13 formed in the walls 5 between the body 2 and the hole punch 4. The windows 13 allow the fluids flowing in the pipe to reach the electronic module 6. It may be observed that when the hole punch 4 forms an orifice in a wall of a pipe, the cut-off portion 51 (or "chad") remains in the hole punch 4, which is specifically why the windows 13 are formed. The windows 13 also serve to limit the impact of inserting the device in the pipe on the stream of fluid flowing therein.

In the example of this figure, there is no spacer, but the electrical connections 8 serve to hold an electronic module 6 directly. The electronic module 6 is in a substantially horizontal position in the figure: this arrangement, which may be adopted if the electronic module 6 can operate in this arrangement, enables it to be positioned more deeply inside the pipe.

Figure 3B:
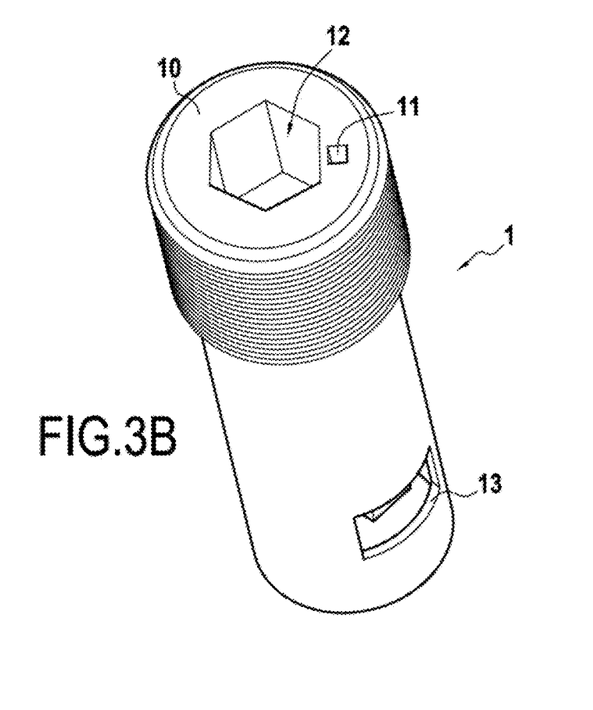

FIG. 3B is another perspective view in which the electronic module 1 presents a top face 10 including a hexagonally-shaped socket 12 for receiving a tool of the Allen key type. The top face 10 also has a female connector 11 for one or more electrical connections passing through the body 2.

Figure 4:
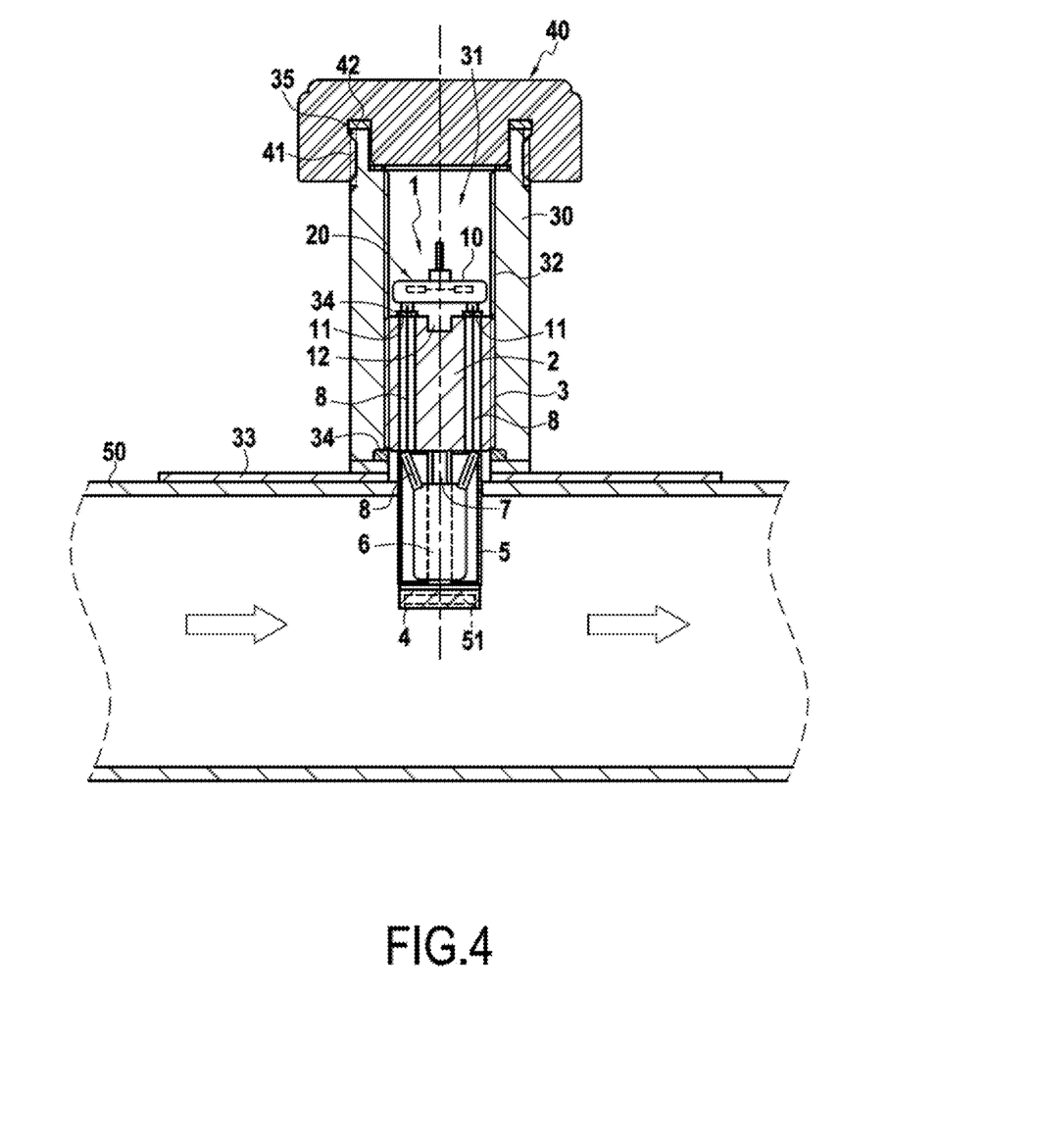
FIG. 4 shows a device inserted in a pipe.

FIG. 4 shows the system as described with reference to FIG. 2 when assembled on a pipe 50. The pipe is a polyethylene pipe having a diameter that may lie in the range 200 millimeters (mm) to 400 mm, although the invention may nevertheless be used on pipes having other diameters. As can be seen in this figure, the device 1 and the sleeve 30 form a system having a total height that is close to the diameter of the pipe. The invention can thus be embodied in a manner that is relatively compact, thereby making it easy to install at numerous points.

FIGS. 5A to 5D show various steps of inserting an electronic device 1 in a pipe 50. These figures are section views looking in a direction that is perpendicular to that of FIGS. 1, 2, and 4.

Figure 5A:
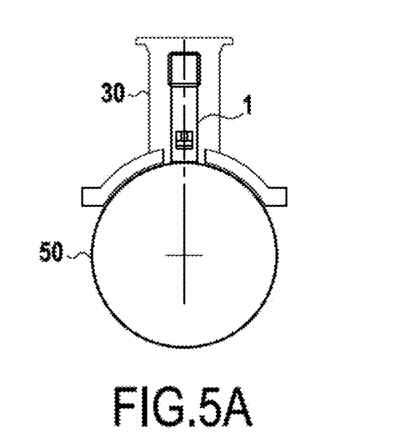
FIGS. 5A, 5B, 5C, and 5D show various steps of inserting a device in a pipe.

In FIG. 5A, the sleeve 30 has been assembled with the pipe 50 by welding. At this stage, the device 1 is arranged fully inside the sleeve 30, and it does not have the connectable element.

Figure 5B:
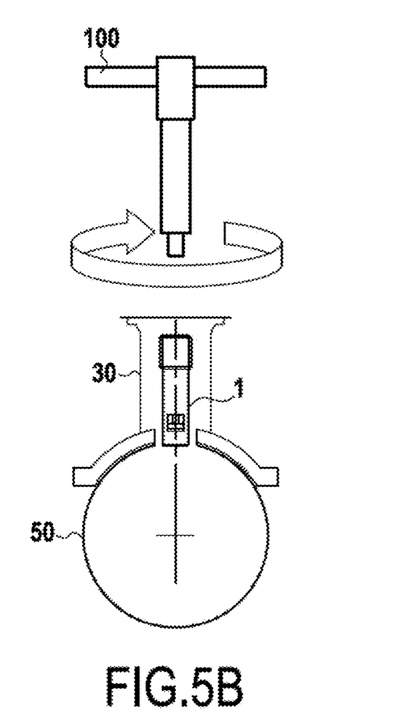

A tool 100 is then used to turn the device 1 so that it pierces an orifice in the pipe 50 (FIG. 5B). This piercing may be done while gas is flowing in the pipe, since the body of the device through which the electrical connections pass acts as a plug inside the sleeve 30.

Figure 5C:
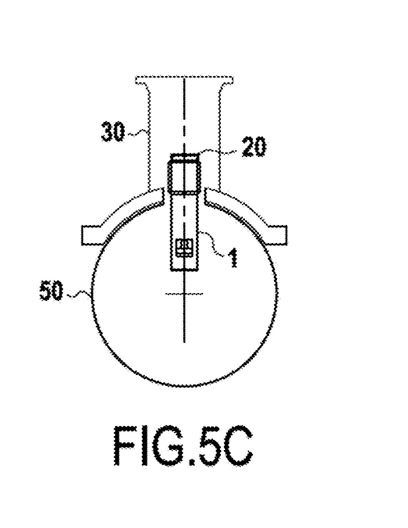

The device 1 continues to be turned until it occupies its final position in the pipe 50, and thereafter the connectable element 20 can be connected to the remainder of the device 1 (FIG. 5C).

Figure 5D:
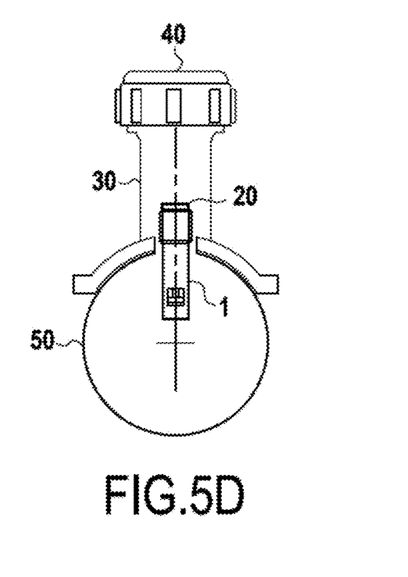

Thereafter, a plug 40 can be put into place on the sleeve 30, as shown in FIG. 5D.

It may be observed that it is also possible to use an additional leaktight airlock for installing or removing the device while a fluid is flowing in the pipe. This can enable an already-installed device to be replaced.

Figure 6A:
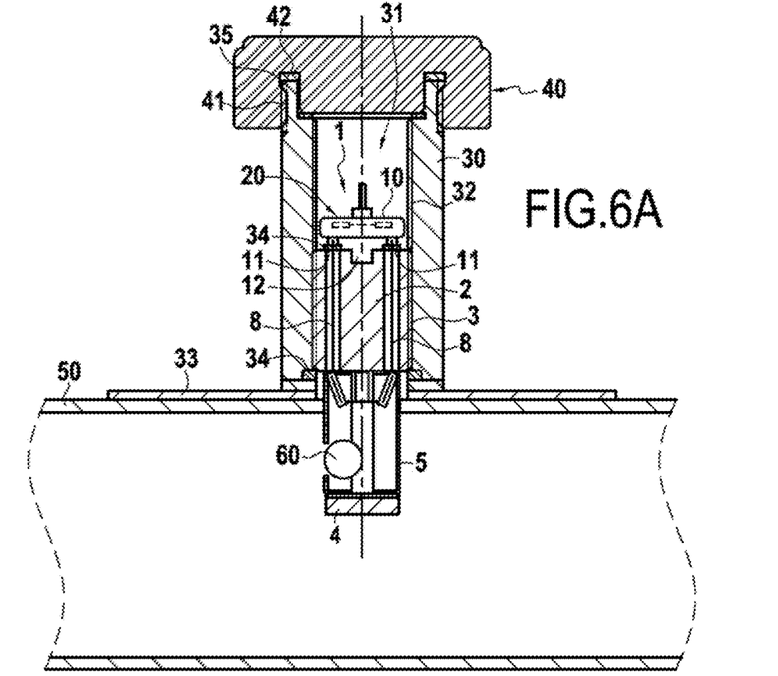
FIGS. 6A and 6B show the use of a device in an embodiment of the invention that is capable of modifying the available section in a pipe.

FIG. 6A shows a variant of the invention in which the electronic module 60 is a module for modifying the section of the pipe and includes an inflatable element.

Figure 6B:
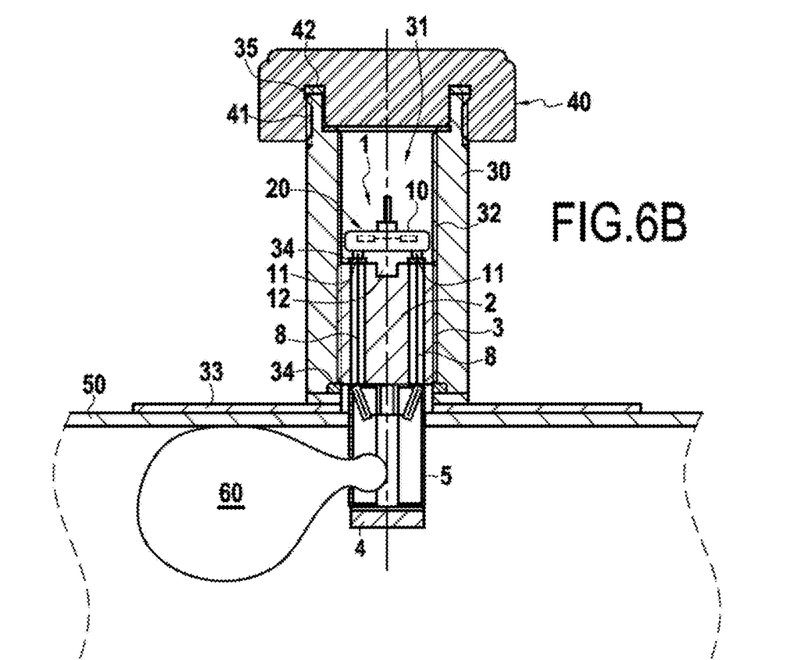

Activation of this electronic module 60 is shown in FIG. 6B, where the inflatable element is shown inflated.

The system shown in FIGS. 6A and 6B makes it simpler to apply remote control to the streams flowing in a network of pipes.

With reference to FIGS. 7A to 7E, there follows a description of the various steps of inserting a device in a pipe while using an airlock.

Figure 7A:
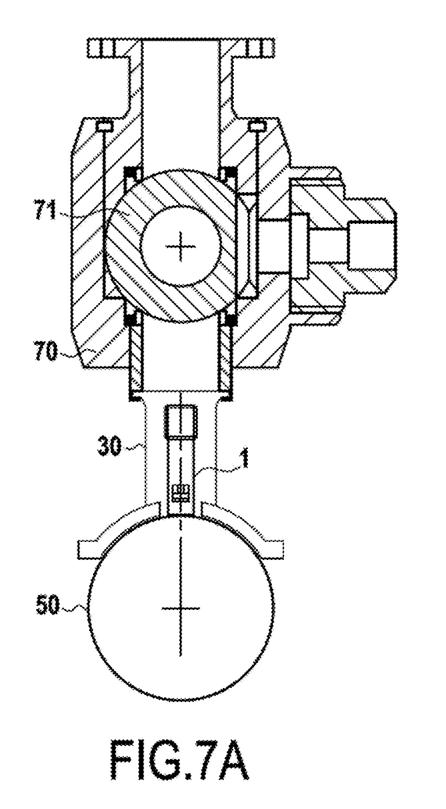
FIGS. 7A, 7B, 7C, 7D, and 7E show various steps of inserting a device in a pipe while using an airlock.

FIG. 7A shows a system analogous to that described with reference to FIG. 5A, but in which the system also includes a first airlock portion 70 having a full-bore valve 71. The first portion of the airlock is screwed onto the sleeve instead of and replacing a plug such as the plug 40 described with reference to FIG. 5D.

Figure 7B:
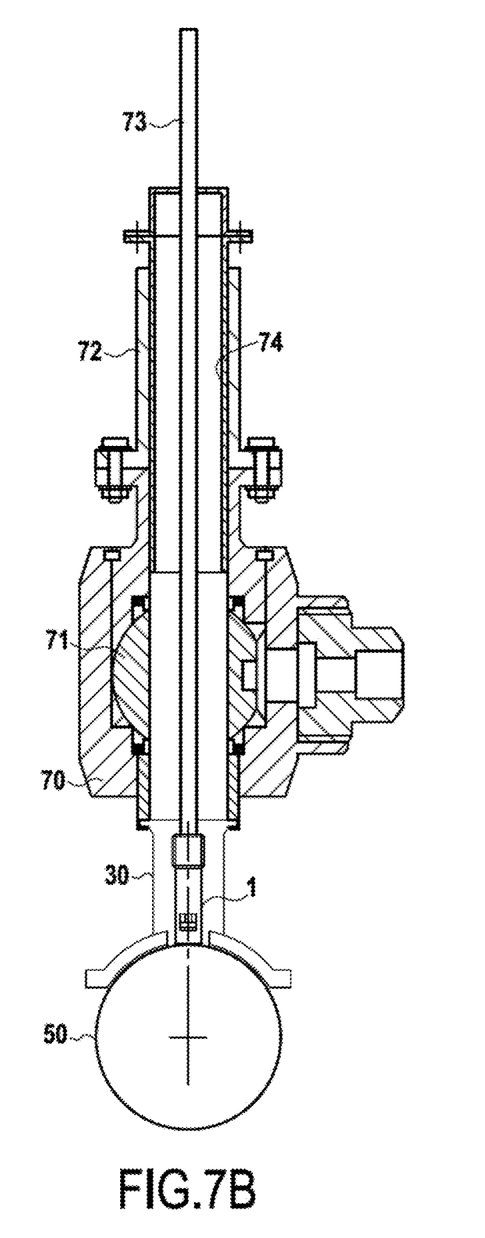

FIG. 7B shows a second airlock portion 72 assembled on the first airlock portion 70, these two airlock portions 70 and 72 together forming an airlock with an airlock duct 74. In the example of FIG. 7B, the full-bore valve 71 is in an open or through position, and a tool 73 has been inserted in leaktight manner into the airlock duct 74 received in the airlock portions 70 and 72, so that the tool thus passes into the airlock.

The tool 73 co-operates with the electronic device and can be used to turn it.

Figure 7C:
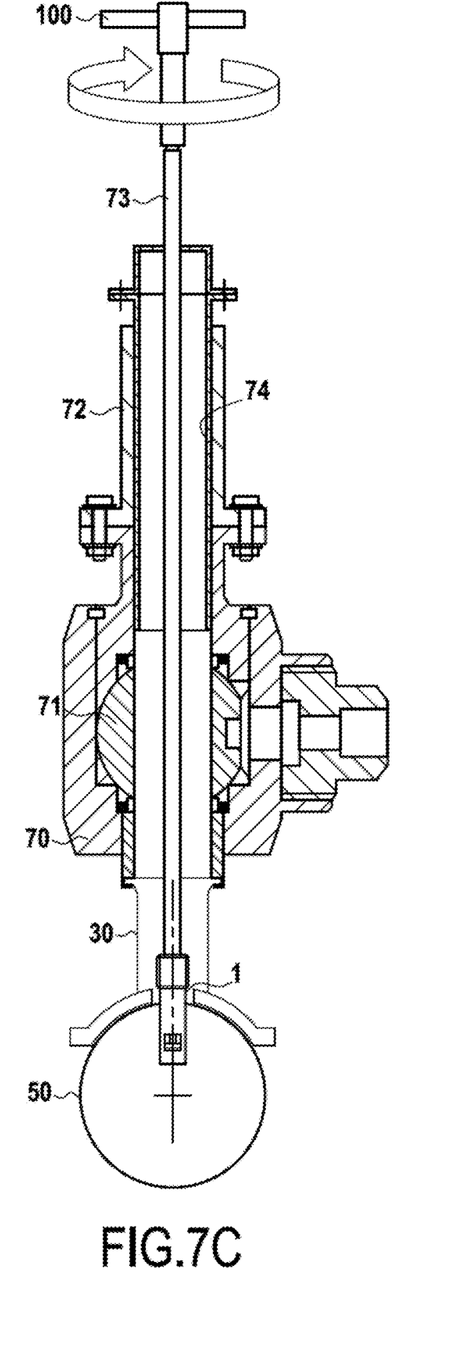

A tool 100 may be used on the portion of the tool 73 that projects in leaktight manner from the second airlock portion 72 (FIG. 7C). It is used to turn the device 1 in the sleeve 30 so as to drive it forwards into the pipe 50. The airlock makes it possible to obtain good leaktightness while driving the device 1 into the pipe 50.

Figure 7D:
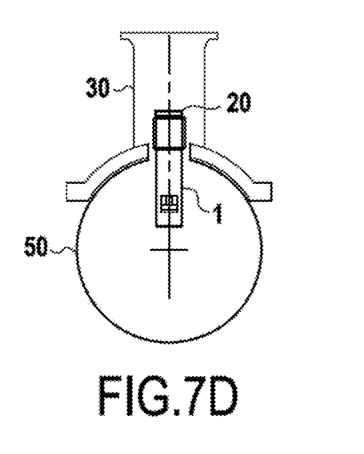
Figure 7E:
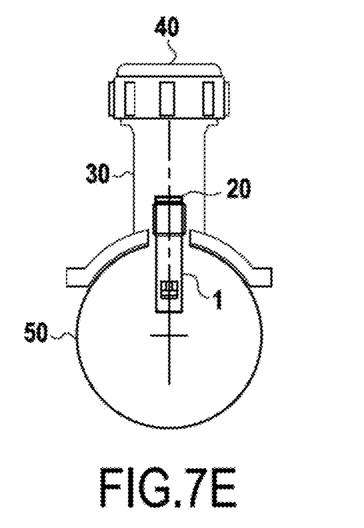

FIG. 7D shows a connectable element 20 being put into place and FIG. 7E shows a plug 40 being put into place on the sleeve 30. The connectable element 20 includes at least one embedded electrical power supply, a wireless communications module, a microcontroller, or a switch. The connectable element 20 is connected only after the pipe has been pierced.

With reference to FIGS. 8A to 8E, there follows a description of removing an electronic device while using an airlock.

Figure 8A:
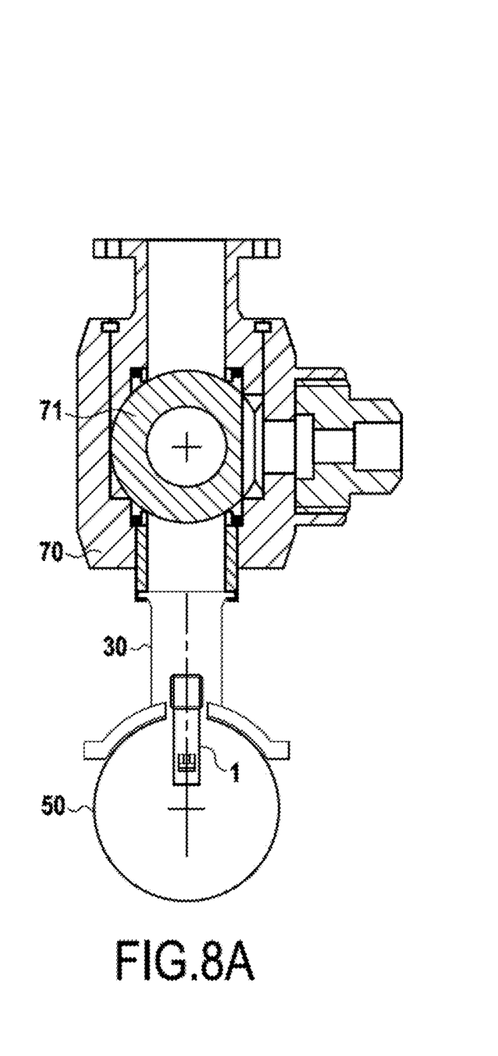
FIGS. 8A, 8B, 8C, 8D, and 8E show various steps of removing a device that has already been installed in a pipe.

In FIG. 8A, there can be seen a device 1 inserted in a pipe, such as the device shown in FIG. 5D, from which the connectable element 20 has already been removed. Instead of and replacing the plug of FIG. 5D, a first airlock portion 70 is assembled on the sleeve. The full-bore valve 71 is initially closed.

Figure 8B:
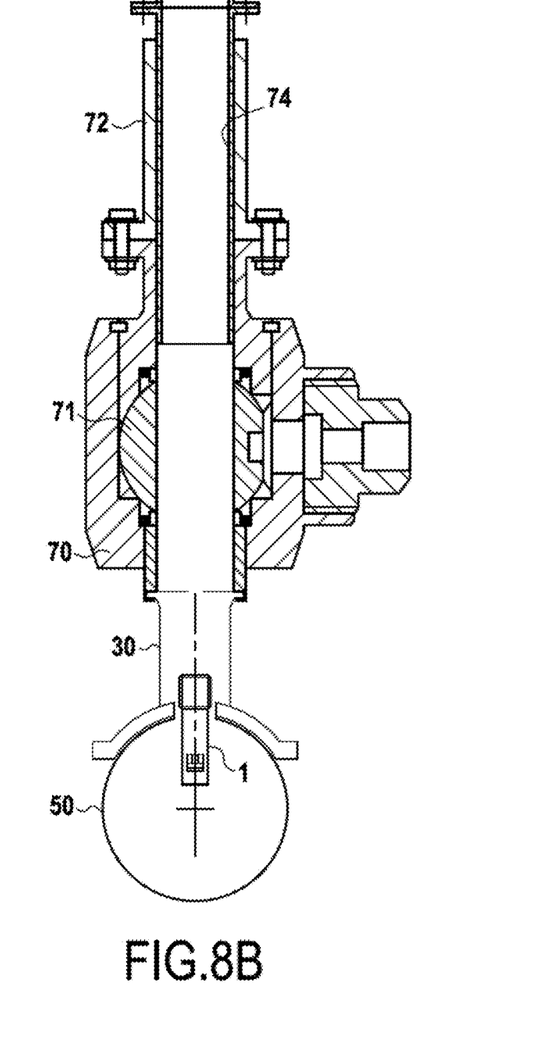

FIG. 8B shows the assembly of a second airlock portion 72 and the opening of the full-bore valve 71.

Figure 8C:
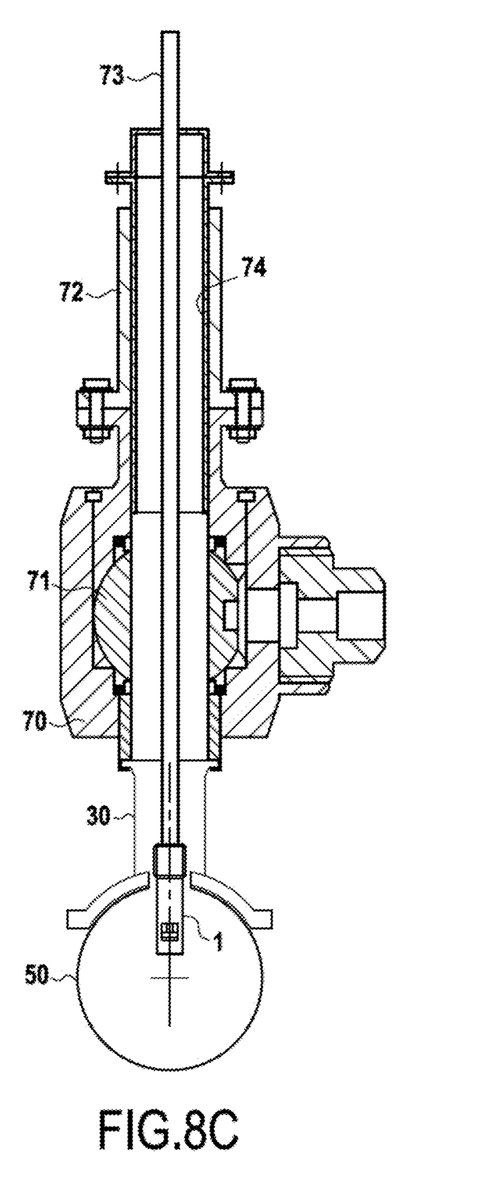

FIG. 8C shows a tool 73 being inserted in leaktight manner into the airlock duct 74 received in the first and second airlock portions 70 and 72 so as to reach the device 1. A tool 100 is also used for turning the device 1.

Figure 8D:
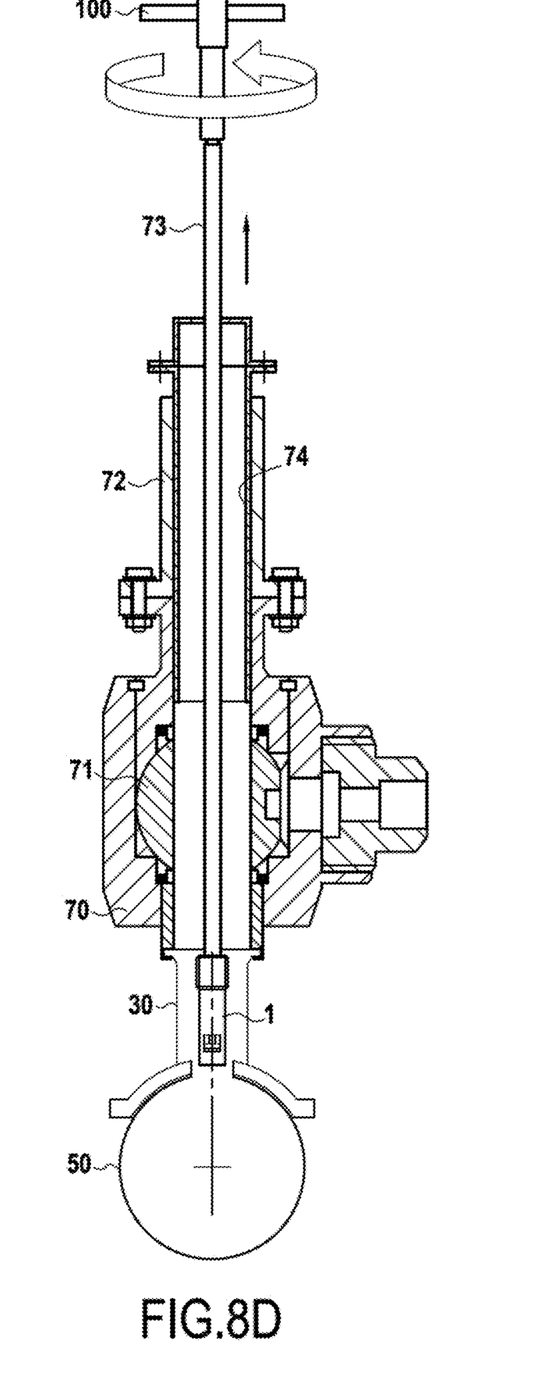

FIG. 8D shows the device 1 extracted from the pipe that was pierced.

The device is then moved into the second airlock portion 72 and the full-bore valve 71 is closed (FIG. 8E): leaktightness is thus maintained even when the second airlock portion is disassembled in order to recover the device 1.

Figure 8E:
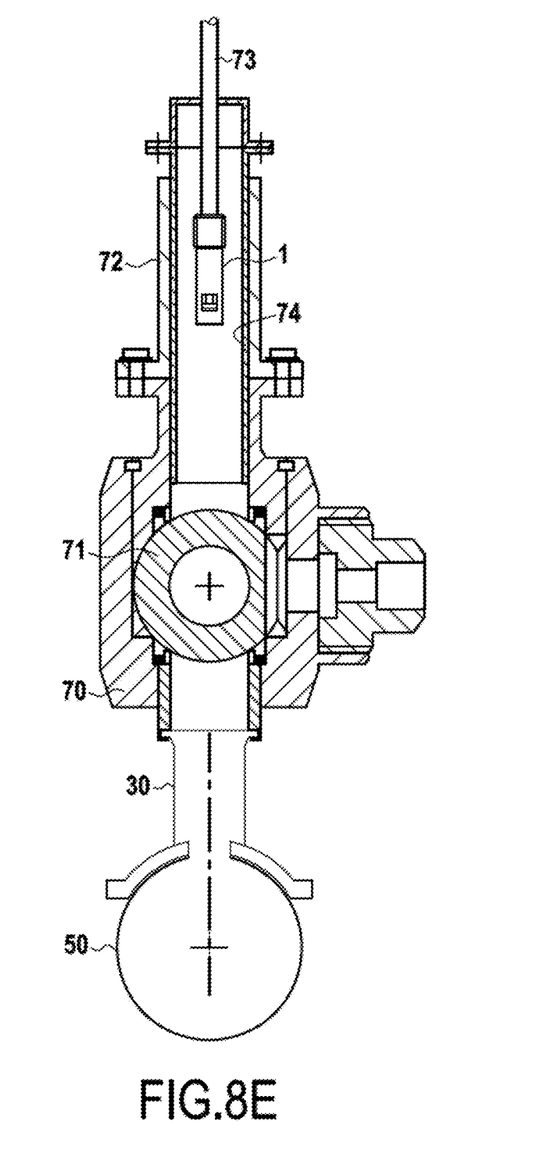

In an embodiment of the invention, the tool 73 is held sufficiently tightly in the device 1 (e.g. in a socket in the device 1) so that movement is performed as follows:
   the device is driven backwards and is raised into the sleeve 30; an
   once it has left the sleeve, it is because the tool 73 is held tightly in the device 1 that the tool 73 enables the device 1 to be moved into the pipe by moving the tool 73.

Alternatively, the device 1 has a socket fitted with a bayonet fastener system so as to fasten the tool 73 to the device 1 (not shown). Movement is then performed as follows:
   the device is driven backwards and is raised into the sleeve 30; and
   once extracted from the sleeve, it is the bayonet fastener means that enable movement of the tool 73 to move the device and raise it into the airlock duct 74.

This enables a device to be removed for which the embedded power supply is exhausted or a device that has failed.

It is also possible to insert a second device in order to carry out a replacement in a pipe that has already been pierced.

The invention thus makes it simple to insert compact electronic devices into pipes, including while a fluid is flowing in the pipe.

The invention claimed is:

1. An electronic device configured to be inserted in a pipe into a final position, the electronic device also configured to be arranged, prior to being inserted into the final position, in a sleeve that is assembled to the pipe and through which there passes a duct opening out onto a wall of the pipe, the electronic device comprising:
   a body having a threaded portion configured to co-operate with a threaded portion of the duct in the sleeve in order to move the electronic device into the final position when the electronic device is turned;
   a hole punch configured to form a through orifice in the pipe while the electronic device is being turned and to enable the electronic device to be inserted into the final position inside the pipe;
   an electronic module arranged between the hole punch and the body and configured to be in contact with a fluid passing through the pipe when the electronic device is in the final position; and
   at least one electrical connection connected to the electronic module and passing through the body leading to a top face of the body situated at an end of the body opposite from an end where the electronic module and the hole punch are situated;
   wherein the body and the at least one electrical connection form a plug of the duct in the sleeve.

2. The electronic device according to claim 1, wherein the top face includes a socket configured to receive a screwdriver tool that is configured to turn the electronic device.

3. The electronic device according to claim 1, wherein the top face includes at least one female electrical connector that is electrically connected to the at least one electrical connection.

4. The electronic device according to claim 1, further comprising a spacer configured to separate the electronic module from the body.

5. The electronic device according to claim 4, wherein the at least one electrical connection extends at least along and over the spacer.

6. The electronic device according to claim 1, further comprising walls configured to hold the hole punch spaced apart from the body, the walls provided with windows configured to allow the fluid in the pipe to pass to the electronic module when the electronic device is in the final position.

7. The electronic device according to claim 1, wherein the electronic module comprises a sensor.

8. The electronic device according to claim 7, wherein:
the sensor comprises a flow meter, and
the electronic device further comprises an indicator that is visible while the electronic device is being turned so as to place the electronic device in a defined direction relative to the pipe.

9. The electronic device according to claim 1, wherein the electronic module comprises a module configured to modify or treat the fluid.

10. The electronic device according to claim 1, further comprising a connectable element that is configured to be connected to the top face of the body and that is configured to be electrically connected to the at least one electrical connection when the connectable element is connected to the top face of the body, the connectable element including at least one additional electronic module comprising at least one of: an embedded electrical power supply, a wireless communications module, a microcontroller, or a switch.

11. The electronic device according to claim 10, wherein:
the top face includes at least one female electrical connector that is electrically connected to the at least one electrical connection; and
the connectable element is pluggable into the at least one female electrical connector.

12. A system comprising:
an electronic device; and
at least one sleeve having a duct in which the electronic device is arranged, the duct having a threaded portion;
wherein the electronic device is configured to be inserted in a pipe into a final position, the electronic device also configured to be arranged, prior to being inserted into the final position, in the at least one sleeve that is assembled to the pipe and through which there passes the duct opening out onto a wall of the pipe;
wherein the electronic device comprises:
a body having a threaded portion configured to co-operate with the threaded portion of the duct in order to move the electronic device into the final position when the electronic device is turned;
a hole punch configured to form a through orifice in the pipe while the electronic device is being turned and to enable the electronic device to be inserted into the final position inside the pipe;
an electronic module arranged between the hole punch and the body and configured to be in contact with a fluid passing through the pipe when the electronic device is in the final position; and
at least one electrical connection connected to the electronic module and passing through the body leading to a top face of the body situated at an end of the body opposite from an end where the electronic module and the hole punch are situated; and
wherein the body and the at least one electrical connection form a plug of the duct.

13. The system according to claim 12, further comprising a leaktight airlock configured to be assembled on the at least one sleeve by screw-fastening, the leaktight airlock including a full-bore valve and an opening configured to pass a tool in a leaktight manner into the airlock in order to reach the electronic device in the at least one sleeve and turn the electronic device in order to move the electronic device in the airlock, the airlock being configured to allow the electronic device to pass through the full-bore valve.

14. A method of installing an electronic device, wherein the electronic device is arranged in a sleeve that is assembled to a pipe and through which there passes a duct opening out at the pipe, the method comprising:
turning the electronic device to move the electronic device in the duct of the sleeve until the electronic device reaches a final position, the electronic device having a body with a threaded portion that co-operates with a threaded portion of the duct in the sleeve in order to move the electronic device into the final position when the electronic device is turned, the electronic device also having an electronic module arranged between a hole punch and the body and configured to be in contact with a fluid passing through the pipe when the electronic device is in the final position; and
using the hole punch, while the electronic device is being turned, to form a through orifice in the pipe in order to enable the electronic device to be inserted in the pipe.

15. The method according to claim 14, wherein the electronic device includes a connectable element that is connectable to a top face of the body, the connectable element configured to be electrically connected to at least one electrical connection of the electronic device when the connectable element is connected to the top face of the body, the connectable element including at least one additional electronic module comprising at least one of: an embedded electrical power supply, a wireless communications module, a microcontroller, or a switch;
the method further comprising, after turning of the electronic device, connecting the connectable element to the top face of the body.

16. The method according to claim 15, further comprising:
assembling a leaktight airlock on the sleeve by screw-fastening, the leaktight airlock including a full-bore valve and an opening configured to pass a tool in a leaktight manner into the airlock in order to reach the electronic device in the sleeve, the airlock configured to enable the electronic device to pass through the full-bore valve, and
using the tool passing through the airlock to turn the electronic device in the sleeve so as to drive the electronic device forwards towards the final position or backwards from the final position.

17. The method according to claim 16, further comprising at least one of:
when the electronic device is driven backwards, passing the electronic device through the full-bore valve and closing the full-bore valve; or
when the electronic device is driven forwards, opening the full-bore valve and moving the electronic device into the sleeve.

18. The method according to claim 17, further comprising:
after driving the electronic device backwards, subsequently inserting a second electronic device into the leaktight airlock, opening the full-bore valve, moving the second electronic device into the sleeve, and driving the second electronic device forwards.

19. The system according to claim 12, wherein the electronic device further comprises walls configured to hold the hole punch spaced apart from the body, the walls provided with windows configured to allow the fluid in the pipe to pass to the electronic module when the electronic device is in the final position.

20. The system according to claim 12, wherein the electronic device further comprises a connectable element that is configured to be connected to the top face of the body and that is configured to be electrically connected to the at least one electrical connection when the connectable element is connected to the top face of the body, the connectable element including at least one additional electronic module comprising at least one of: an embedded electrical power supply, a wireless communications module, a microcontroller, or a switch.

\* \* \* \* \*